US010484433B2

(12) United States Patent
Roth et al.

(10) Patent No.: US 10,484,433 B2
(45) Date of Patent: *Nov. 19, 2019

(54) VIRTUAL COMMUNICATION ENDPOINT SERVICES

(71) Applicant: Amazon Technologies, Inc., Reno, NV (US)

(72) Inventors: Gregory Branchek Roth, Seattle, WA (US); Graeme David Baer, Seattle, WA (US); Eric Jason Brandwine, Haymarket, VA (US)

(73) Assignee: AMAZON TECHNOLGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,722

(22) Filed: Feb. 5, 2018

(65) Prior Publication Data
US 2019/0044979 A1 Feb. 7, 2019

Related U.S. Application Data

(63) Continuation of application No. 15/261,069, filed on Sep. 9, 2016, now Pat. No. 9,888,041, which is a (Continued)

(51) Int. Cl.
H04L 29/00 (2006.01)
H04L 29/06 (2006.01)
(Continued)

(52) U.S. Cl.
CPC ........ *H04L 63/205* (2013.01); *G06F 21/6218* (2013.01); *H04L 63/0272* (2013.01); (Continued)

(58) Field of Classification Search
CPC ....... H04L 63/08; H04L 63/168; H04L 67/10; H04L 63/0218; H04L 63/205; (Continued)

(56) References Cited

U.S. PATENT DOCUMENTS 6,044,155 A 3/2000 Thomlinson
6,549,626 B1 4/2003 Al-Salqan
(Continued)

OTHER PUBLICATIONS

Non-Final Office Action issued in U.S. Appl. No. 13/682,248 dated Dec. 13, 2013.
(Continued)

*Primary Examiner* — Don G Zhao
(74) *Attorney, Agent, or Firm* — Hogan Lovells US LLP

(57) ABSTRACT

Customers can utilize resources of a multi-tenant environment to provide one or more services available to various users. In order to simplify the process for these customers, the multi-tenant environment can include an infrastructure wherein a portion of the resources provide an authentication and/or authorization service that can be leveraged by the customer services. These resources can logically sit in front of the resources used to provide the customer services, such that a user request must pass through the authorization and authentication service before being directed to the customer service. Such resources can provide other functionality as well, such as load balancing and metering.

20 Claims, 4 Drawing Sheets

Related U.S. Application Data continuation of application No. 13/682,248, filed on Nov. 20, 2012, now Pat. No. 9,444,800.

(51) Int. Cl.
*H04L 29/08* (2006.01)
*G06F 21/62* (2013.01)

(52) U.S. Cl.
CPC ............ *H04L 63/08* (2013.01); *H04L 63/083* (2013.01); *H04L 63/0861* (2013.01); *H04L 63/10* (2013.01); *H04L 63/123* (2013.01); *H04L 67/10* (2013.01); *H04L 67/1002* (2013.01); *H04L 63/0218* (2013.01); *H04L 63/1458* (2013.01); *H04L 63/168* (2013.01)

(58) Field of Classification Search
CPC . H04L 67/1002; H04L 63/10; H04L 63/0272; H04L 63/0861; H04L 63/083; H04L 63/123; H04L 63/1458; G06F 21/53; G06F 21/6218
See application file for complete search history.

(56) References Cited

U.S. PATENT DOCUMENTS

| | | |
|---|---|---|
| 7,051,066 B1 * | 5/2006 | Albert ............... H04L 67/1002 709/202 |
| 7,480,934 B2 | 1/2009 | Chan |
| 7,596,696 B1 | 9/2009 | Perlman |
| 7,921,299 B1 | 4/2011 | Anantha et al. |
| 7,958,545 B2 | 6/2011 | Chan |
| 8,359,396 B2 | 1/2013 | Chan |
| 8,494,167 B2 | 7/2013 | Garimella |
| 8,565,422 B2 | 10/2013 | Lee et al. |
| 8,769,274 B2 | 7/2014 | Chao |
| 9,071,429 B1 | 6/2015 | Roth |
| 9,231,930 B1 | 1/2016 | Roth |
| 9,363,180 B2 * | 6/2016 | Beliveau ............. H04L 45/38 |
| 2002/0095454 A1 | 7/2002 | Reed et al. |
| 2003/0167197 A1 | 9/2003 | Shoemaker et al. |
| 2004/0260651 A1 | 12/2004 | Chan et al. |
| 2006/0048210 A1 | 3/2006 | Hildre |
| 2006/0122946 A1 | 6/2006 | Fahrny et al. |
| 2006/0294199 A1 | 12/2006 | Bertholf |
| 2007/0240206 A1 | 10/2007 | Wu et al. |
| 2008/0016352 A1 | 1/2008 | Perlman |
| 2008/0065974 A1 | 3/2008 | Campbell |
| 2008/0141040 A1 | 6/2008 | Biddle |
| 2008/0144825 A1 | 6/2008 | Dias et al. |
| 2008/0192940 A1 | 8/2008 | Feng |
| 2008/0219453 A1 | 9/2008 | Chang |
| 2008/0307409 A1 | 12/2008 | Lu |
| 2009/0125413 A1 | 5/2009 | Le Chevalier et al. |
| 2009/0150985 A1 | 6/2009 | Chan |
| 2009/0240690 A1 | 9/2009 | Archibald |
| 2009/0249439 A1 | 10/2009 | Olden et al. |
| 2009/0249440 A1 | 10/2009 | Platt et al. |
| 2010/0036458 A1 | 2/2010 | Duftner et al. |
| 2010/0199089 A1 | 8/2010 | Vysogorets |
| 2010/0241595 A1 | 9/2010 | Felsher |
| 2010/0318782 A1 | 12/2010 | Auradkar |
| 2011/0145357 A1 | 6/2011 | Saeed |
| 2011/0191831 A1 | 8/2011 | Chan et al. |
| 2011/0258692 A1 | 10/2011 | Morrison et al. |
| 2012/0066757 A1 | 3/2012 | Vysogorets |
| 2012/0117183 A1 | 5/2012 | Wong et al. |
| 2012/0144023 A1 | 6/2012 | Guest et al. |
| 2012/0166818 A1 | 6/2012 | Orsini et al. |
| 2012/0216133 A1 | 8/2012 | Barker |
| 2012/0233668 A1 | 9/2012 | Leafe et al. |
| 2012/0265643 A1 | 10/2012 | Vandervort |
| 2012/0265976 A1 | 10/2012 | Spiers et al. |
| 2012/0266231 A1 | 10/2012 | Spiers et al. |
| 2013/0018999 A1 | 1/2013 | Merrill |
| 2013/0125226 A1 | 5/2013 | Shah |
| 2013/0148810 A1 | 6/2013 | Goel |
| 2013/0179982 A1 | 7/2013 | Bridges et al. |
| 2013/0205028 A1 | 8/2013 | Crockett et al. |
| 2013/0212367 A1 | 8/2013 | Ingalls |
| 2013/0238785 A1 | 9/2013 | Hawk et al. |
| 2013/0247034 A1 | 9/2013 | Messerli |
| 2013/0304903 A1 | 11/2013 | Mick et al. |
| 2014/0020072 A1 | 1/2014 | Thomas |
| 2014/0026194 A1 | 1/2014 | Smith |
| 2014/0029431 A1 * | 1/2014 | Haberland ............ H04W 88/08 370/235 |
| 2014/0050317 A1 | 2/2014 | Sabin |
| 2014/0068266 A1 | 3/2014 | Cismas |
| 2014/0208100 A1 | 7/2014 | Kendall |
| 2014/0280927 A1 | 9/2014 | Ferris |
| 2014/0321641 A1 | 10/2014 | Khosravi |
| 2015/0142856 A1 | 5/2015 | Salinas |
| 2015/0154057 A1 | 6/2015 | McGrath |
| 2015/0220561 A1 | 8/2015 | Goetz |

OTHER PUBLICATIONS

Final Office Action issued in U.S. Appl. No. 13/682,248 dated May 8, 2014.
Non-Final Office Action issued in U.S. Appl. No. 13/682,248 dated Oct. 31, 2014.
Final Office Action issued in U.S. Appl. No. 13/682,248 dated May 8, 2015.
Non-Final Office Action issued in U.S. Appl. No. 13/682,248 dated Sep. 18, 2015.
Notice of Allowance issued in U.S. Appl. No. 13/682,248 dated Mar. 28, 2016.
Non-Final Office Action issued in U.S. Appl. No. 15/261,069 dated Mar. 16, 2017.
Notice of Allowance issued in U.S. Appl. No. 15/261,069 dated Oct. 12, 2017.
Non-Final Office Action issued in U.S. Appl. No. 13/682,318 dated Nov. 23, 2013.
Final Office Action issued in U.S. Appl. No. 13/682,318 dated Jun. 25, 2014.
Non-Final Office Action issued in U.S. Appl. No. 13/682,318 dated Oct. 6, 2014.
Final Office Action issued in U.S. Appl. No. 13/682,318 dated Jan. 14, 2015.
Notice of Allowance issued in U.S. Appl. No. 13/682,318 dated Sep. 14, 2015.
Non-Final Office Action issued in U.S. Appl. No. 13/873,083 dated Aug. 27, 2014.
Shamir's Secret Sharing from Wikipedia, Wayback Machine Aug. 2, 2010.
Notice of Allowance issued in U.S. Appl. No. 13/873,083, dated Mar. 6, 2015.
Non-Final Office Action issued in U.S. Appl. No. 14/754,321 dated Feb. 13, 2017.
Final Office Action issued in U.S. Appl. No. 14/754,321 dated Aug. 11, 2017.
Notice of Allowance issued in U.S. Appl. No. 14/754,321 dated Nov. 7, 2017.

* cited by examiner

VIRTUAL COMMUNICATION ENDPOINT SERVICES

This application is a continuation of allowed U.S. application Ser. No. 15/261,069, filed Sep. 9, 2016, which is a continuation of U.S. application Ser. No. 13/682,248, now U.S. Pat. No. 9,444,800, filed Nov. 20, 2012, both entitled "VIRTUAL COMMUNICATION ENDPOINT SERVICES," which are incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, the provider environment can support tasks such as request authentication and authorization to prevent unauthorized access to services offered by the customer through resources of the provider environment. In many cases, however, the customer does not want to be responsible for managing the authentication and/or authorization processes.

BRIEF DESCRIPTION OF THE DRAWINGS

Various embodiments in accordance with the present disclosure will be described with reference to the drawings, in which.

DETAILED DESCRIPTION

Figure 1:
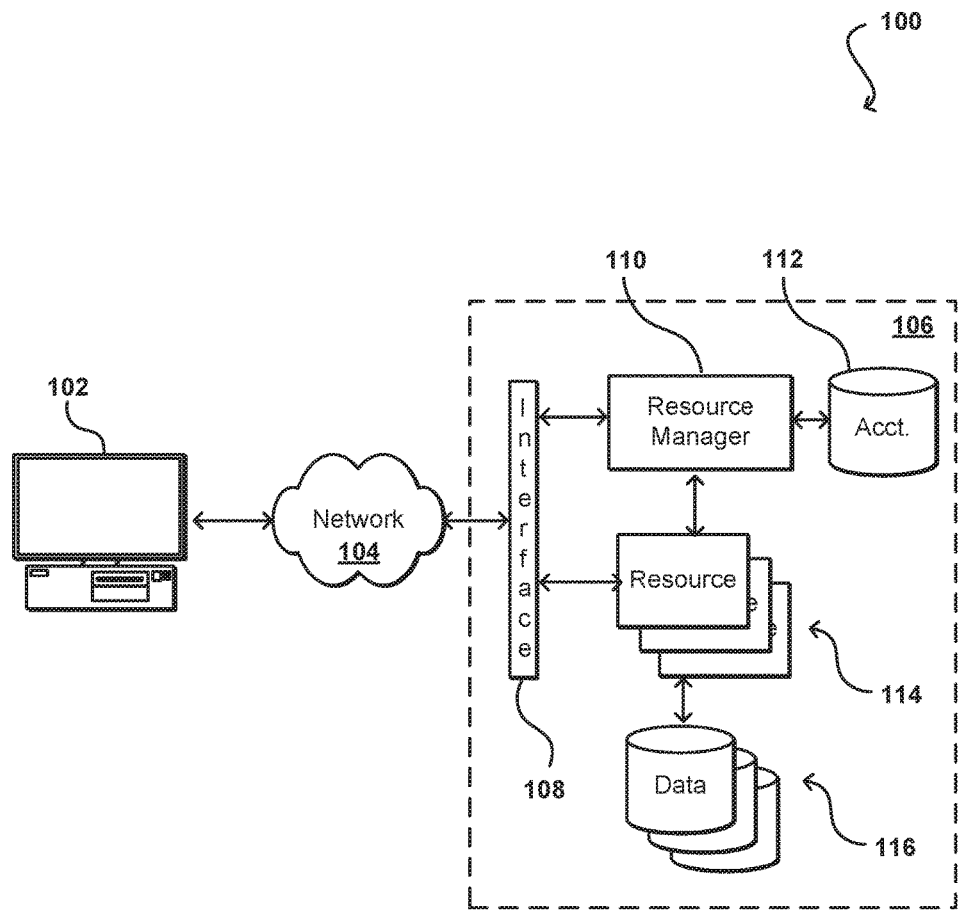
FIG. 1 illustrates an example environment in which various embodiments can be implemented.

Systems and methods in accordance with various embodiments of the present disclosure may overcome one or more of the aforementioned and other deficiencies experienced in conventional approaches to managing aspects of multi-tenant resources in a computing environment. In particular, various embodiments provide mechanisms for ensuring authorized access to one or more shared resources in the computing environment, as well as managing credentials for customers of the multi-tenant environment. Customers can obtain access to the shared resources, but in many cases will not want to be responsible for managing the authentication and/or authorization processes for those resources. The customers may therefore desire request authentication and authorization services to be managed by the provider of the resources. These request authentication and authorization services can enable customers to offer their own services to others of the provider's customers. They can also enable customers to leverage a granular permissions system provided by the provider without needing to build their own request authentication and authorization systems.

One or more of the resources in a multi-tenant environment can be utilized as a virtual load balancer (i.e., in place of a dedicated hardware load balancer), in order to direct requests to the appropriate resources, services, and/or endpoints in the multi-tenant environment. Such resources also can be utilized to perform request authentication and authorization, for at least certain types of requests, requests for certain customers or resources, etc. The authentication and/or authorization can be performed before passing the request to a targeted resource or service, and the request can be annotated with authentication and authorization information resulting from the process. Such a process enables authentication and authorization to be provided as part of a request management service that can be leveraged by various customers having services offered through the multi-tenant environment. An additional benefit of such functionality is that tasks such as per-customer throttling and metering can be integrated with the virtual load balancer, as the multi-tenant environment can have access to information such as request volume and pricing information.

It should be understood, however, that in at least some embodiments one or more separate resources (physical or virtual) can be used for authentication, authorization, and other such tasks described and suggested herein that is used for load balancing. The service can make it easier for customers to provide services in the multi-tenant environment, and can enable customers to build their own services on top of the infrastructure in the multi-tenant environment. These services offered by customers of a multi-tenant environment are referred to herein as virtual endpoints, as may include virtual application programming interfaces (APIs). These services can be authored in at least some embodiments by programmatically configuring request services of the environment to provide a virtual API. In some embodiments virtual APIs may be consumed from other customer accounts within the multi-tenant environment, while in other embodiments the virtual APIs may be consumed only within the account offering them. In embodiments where virtual APIs may be consumed across accounts, access to resources within the calling account may be granted by the call to the virtual API, in to enable the virtual API to service the request. In at least some embodiments, the defining of a virtual API can be performed without first providing payment to the provider. Resources used in the provisioning of virtual API services then can be direct-billed to the caller of the virtual API, optionally with mark-up or other information.

Various other applications, processes, and uses are presented below with respect to the various embodiments.

FIG. 1 illustrates an example environment 100 in which aspects of the various embodiments can be implemented. In this example a customer of a multi-tenant environment 106 is able to utilize a client device 102 to submit requests across at least one network 104 to at least one designated address or interface of the multi-tenant environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The multi-tenant environment 106 can be supported and/or offered by a resource provider, and can include any appropriate components for receiving requests and returning information or performing actions in response to those requests.

As an example, the environment might include Web servers and/or application servers for receiving and processing requests, then returning data, Web pages, video, audio, or other such content or information in response to the request. In many cases, the customer will have an account with the provider of the multi-tenant environment that indicates which resources or types of resources the customer can access, an amount of that access, types of tasks that can be performed with that access, or other such terms. One or more users might be associated with the customer, and thus can be able to access the resources per the customer account.

In various embodiments, the environment 106 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant environment is often referred to as resource sharing, Web services, or "cloud computing," among other such terms and depending upon the specific environment and/or implementation. In this example the multi-tenant environment includes a plurality of resources 114 of one or more types. These types can include, for example, application servers operable to process instructions provided by a user or database servers operable to process data stored in one or more data stores 116 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 114 can submit a request that is received to an interface layer 108 of the multi-tenant environment 106. The interface layer can include application programming interfaces (APIs) or other exposed interfaces enabling a user to submit requests to the multi-tenant environment. The interface layer 108 in this example can also include other components as well, such as at least one Web server, routing components, load balancers, and the like. When a request to provision a resource is received to the interface layer 108, for example, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account, or is associated with a customer having an existing account, with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

An advantage of providing customer services through a multi-tenant environment is that the environment can provide a significant amount of scalability, as additional resources can be added or removed from a service as necessary in order to support the workload at a given time, within the limits of the terms of use of the customer with the provider of the multi-tenant environment. When an environment supports multiple such services, which can have a frequently changing number of resources allocated to supporting those services, it can be difficult to utilize conventional hardware devices such as hardware load balancers where the distribution paths for the requests can be constantly changing and the devices need to be continually reconfigured. In order to simplify the process in at least some aspects, certain multi-tenant environments utilize some of the resources offered through the environment to provide load balancing using a "virtual" load balancer. Such an approach is advantageous as new load balancing resources can be added, and resources removed, as needed due to changes in demand. Further, during periods of lower volume the resources can be used for other tasks, maximizing utilization of the resources versus having a full set of hardware load balancers that will most of the time be underutilized.

Figure 2:
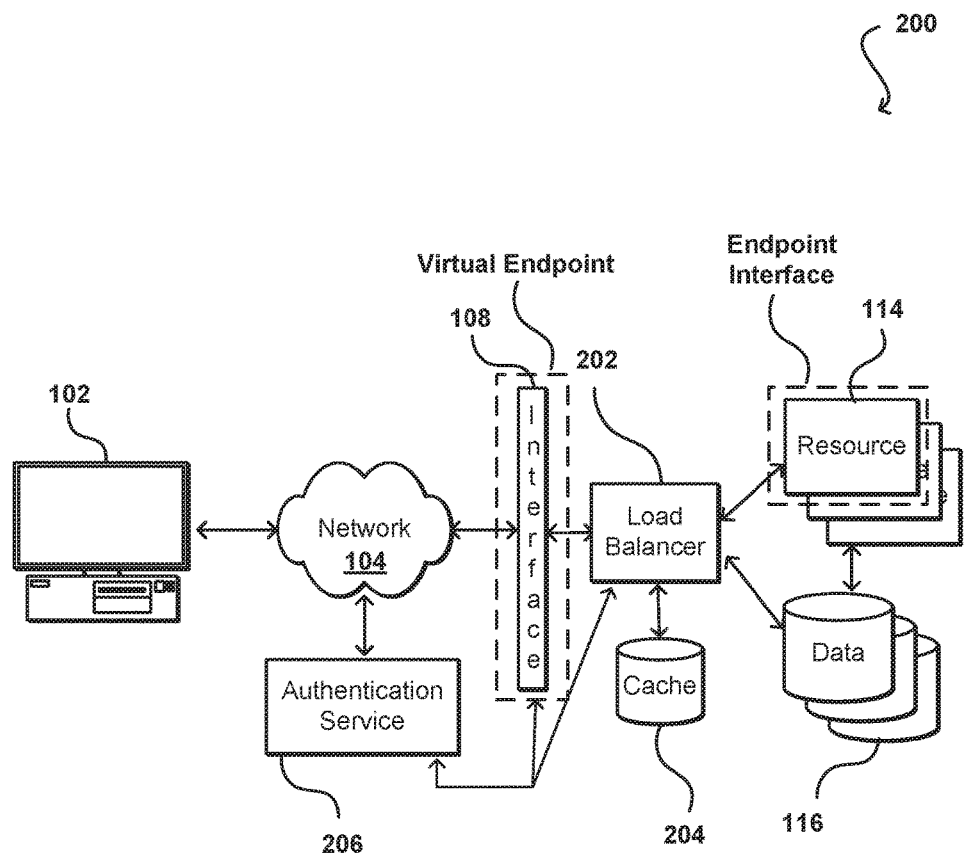
FIG. 2 illustrates an example configuration using a request management service for providing authentication and authorization that can be used in accordance with various embodiments.

FIG. 2 illustrates an example situation 200 wherein one of the resources 114 of the multi-tenant environment has been configured to function as a load balancer 202 that logically sits along a path between the interface layer 108 of the multi-tenant environment and the resources 114, data stores 116, and other components or endpoints used to support customer services in the multi-tenant environment. It should be understood that reference numbers may be carried over for similar components between figures for purposes of simplicity of explanation, but such usage should not be interpreted as a limitation on the various embodiments unless otherwise stated. In this example, the load balancer 202 may be one of a plurality of resources providing a load balancing service that can be leveraged by customers to improve the distribution of requests across various resources allocated to the customer, in order to improve the efficiency and performance of the customer service. A virtual load balancer or load balancer service can also perform tasks such as to monitor the health of backend services, as well as to handle the scaling and redundancy, etc.

Approaches in accordance with various embodiments can utilize this infrastructure to also offer customer service-accessible authentication and other request management services, which can perform tasks such as request authentication (including but not limited to request canonicalization and signature verification) and authorization (such as policy language evaluation). These resources and/or services thus can function as virtual endpoints, such as virtual application programming interface (API) endpoints, to which users can direct requests, such as Web service requests. The virtual endpoints then can perform tasks such as authentication and authorization for the request, which can include authentication based at least in part upon clientAuth SSL, signed assertions, and Internet Protocol Security (IPSec) functionality, among others. Request authentication and authorization can be performed on a request received from a client device 102 over a network 104 to an interface layer 108 of the multi-tenant environment, which is then directed to the virtual endpoint as if the endpoint is an API for receiving Web service calls to the customer service. If the request is successfully authenticated and/or authorized, information for the authentication and/or authorization can be added to the request, which can then be forwarded to the appropriate resources 114 allocated to supporting the customer service.

In some embodiments, such a request management service can accept signed requests from customers as may be generated using one or more software development kits (SDKs), which can correspond to public protocols or be available from a provider of the multi-tenant environment. The service can determine information such as the entity that signed the request, the key or credential that way used, any policies that should be applied to the request, and ultimately whether the request should be forwarded to the corresponding client service. Determining this information can include tasks such as parsing incoming requests, building an authorization context, extracting and verifying signatures, performing basic authorization, and passing additional metadata about an authenticated identity for a request to the appropriate client service. As used herein, a "signature" refers to any cryptographic annotation of a message including, but not limited to, symmetric message authentication such as HMAC, asymmetric digital signature such as RSA or DSA, etc.

In at least some embodiments, each user wanting to access a customer service that was the request management service might have to have an account with a provider of the multi-tenant environment. Such an approach can be beneficial as the request management service can have proof that the request was received from another customer of the environment, placing the request management service in a strong position to selectively enable, subject to the instructions of the customer, an amount of forward access in the environment.

Figure 3:
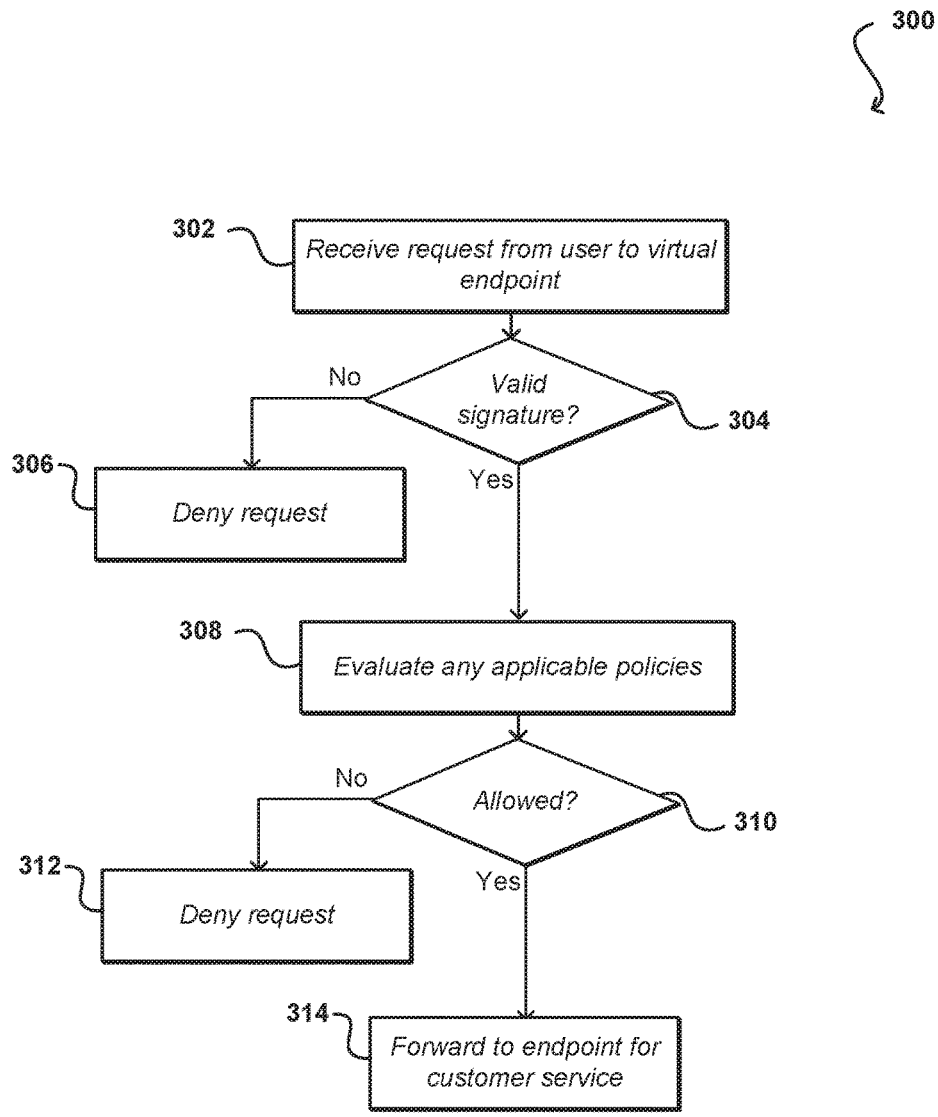
FIG. 3 illustrates an example process for managing requests using a service in a multi-tenant environment that can be utilized in accordance with various embodiments.

FIG. 3 illustrates an example process 300 for managing requests for a customer service in a multi-tenant environment that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request is received 302 from a user of a customer service (who may also be a customer of the multi-tenant environment) to the request management service, which can function as an abstraction of an API endpoint in at least some embodiments. As discussed, the request might be sent to a virtual API or other such endpoint that causes the request to be directed to the request management service. The request in this example is signed by the user using a signature algorithm and credentials associated with the user and/or the customer. The request management service can utilize a canonicalization algorithm or other such approach to determine whether the signature used to sign the request is valid and/or matches an appropriate string or credential for the user and/or customer service. The canonicalization process can be used in order to handle proxies, client libraries, or other bumps along the software path that might modify the request but retain the semantic meaning of the request. A determination then can be made 304 as to whether the signature is a valid signature. The service in some embodiments might consult a local cache, such as the cache 204 in FIG. 2, in order to determine appropriate signing material to attempt to verify the signature autonomously. In other embodiments, the service might transmit some information for the request to a separate authentication and authorization service, such as the service 206 in FIG. 2, that is able to analyze the information, determine the alleged signor as well as the validity of the signature. The service can be located across the at least one network 104, or can communicate directly with the interface 108 and/or load balancer 202. That service then may return information about who signed the request, as may include an identifier and potentially one or more other attributes. In some embodiments, a policy might be applied to that identity either by the authentication service or the request management service. The request management service then can determine whether the signature of the request is valid based at least in part upon the identity of the user and any applicable policy.

If the signature is determined not to be a valid signature, the request is denied 306. If the signature is determined to be a valid signature, the request management service in some embodiments might also need to determine a logical authorization question to be answered, as may correspond to the request being made, the action being taken, and the resource to be acted upon. The request management service in some embodiments can also attempt to retrieve any additional policies with respect to the customer service and/or associated resource(s). The request management service in some embodiments is be configured broadly with a policy about the set of user who are able to make requests. In some embodiments the request management service may check whether a caller has subscribed to the service or has otherwise agreed to pay relevant charges. Any applicable policies then can be evaluated 308 to determine whether to allow the request. If the request is determined 310 to not be allowed, the request can be rejected 312. If the request is determined to be allowed, the request can be forwarded 314 to the customer service, and in at least some embodiments information about the user associated with the request can be sent as well. In some embodiments the additional information might also be signed, and information about allowed and/or rejected requests can be written to an audit log for the request management service.

In some embodiments, a request management service can be leveraged by customers for resources or services that are not offered via the multi-tenant environment. For example, a customer might be a provider of an application that accesses the customer's servers for various tasks, but the customer might not want to be responsible for storing the security credentials, managing the authorization process, etc., such that the customer might subscribe to the request management service to manage these and other such tasks on the customer's behalf. In some embodiments a customer might own an identity pool and might trust the multi-tenant environment, but not the end users, to authenticate against the identity pool. In some embodiments, a user can authenticate to the request management service, acting as a virtual endpoint, and then the resource management service can make a signed assertion about the identity of the user and one or more tasks that the user is authorized to perform according to one or more customer rules or policies. In this way, the symmetric keys or other credentials used to authenticate requests never need to be exposed to the customer or other such entities.

A request management service can perform various other types of tasks as well. For example, once information about a user submitting a request is known, a degree of partitioning can be performed for the user. There can also be some amount of throttling or request shaping performed based at least in part upon the user, and any limits for the user can be enforced as well.

In some embodiments a customer does not need to specify any configuration information. A customer can subscribe to a request management service for purposes of authentication without any authorization, in which can the request management service does not need configuration information around the semantics of requests.

In embodiments where such configuration information is needed, one or more policies might be used to determine that configuration information. In some embodiments, one or more translations might be performed on a policy before passing along that policy. A translation might be performed in order to filter out things that are irrelevant, perform any applicable preprocessing, and/or convert a policy into an equivalent language that might be supported in a particular environment. Thus, a received policy might be authenticated and then translated into something that the customer's policy evaluation engine can evaluate. In this case the policy might be specified by the user, who can be a customer of the customer. The request management service can take the collection of all such policies, which may include irrelevant policies for other services, and remove information that is relevant to this particular service. The policy then can be translated and compiled to an appropriate language, such as JavaScript, that can be evaluated with respect to a different environment.

In some embodiments, the request management service can determine at least a set of actions that are being taken. Configuration and/or rules might be provided to enable the request management service to parse a received request and determine actions and/or resources corresponding to the request, enabling the service to perform policy evaluation. The configuration might include a set of policies, which might be used to model things such as subscriptions. Policies might then be stored as associated with resources, services, or customers. A first customer might utilize the request management service to specify a virtual API endpoint for a specific customer service. The first customer might have policies about the other customers subscribed to the service that are able to make calls into the service, and what those calls can include. For example, a second customer who is subscribed to the customer service might be able to call certain functionality but not certain other functionality, as may depend upon the type of account or relationship with the second customer. That account may also have one or more users within the account, policies can be set to restrict individual users within that account to particular subsets of the functionality.

In some embodiments, upon determining an action and a resource, the request management service can attempt to determine an additional policy that may be set with respect to a particular resource. In some embodiments the call can be in the form of a Web services call to a customer endpoint, or can involve a read of a particular resource. A customer can be able to store policies associated with the resources, and can express query rules for how policies are to be retrieved and/or applied. Such an approach enables a customer offering the endpoint to leverage additional policies in place for specific resources.

Another advantage to various approaches discussed herein is that requests that fail validation can be absorbed up to a fairly high level in the network stack, providing for an amount of denial of service (DoS) attack mitigation. The multi-tenant environment typically can scale as needed, and can detect potentially fraudulent requests as various levels of the network stack, thus being more resistant to DoS attacks. As used herein, a "fraudulent request" refers, without limitation, to a request intended to consume resources without payment, intended to interfere with the proper operation of the service, intended to increase the cost of operating the service disproportionately, attempting to deny access to legitimate users of the service, attempting to access data without authorization, and/or attempting to repeatedly access a resource to which access is denied. Further, there are multiple levels at which the multi-tenant environment can reject a request. For example, an interface layer might be able to identify things that do not appear to be valid signatures before the signatures are actually evaluated. Certain requests can be denied that can be determined to fail even if the signature is correct. In some embodiments, load can be shaped based at least in part upon an alleged signor to limit the amount of resources that is dedicated to any particular user. Requests can be discarded that do not appear to correspond to valid credentials. Such functionality can be offered for both single-tenant and multi-tenant implementations, and for multi-tenant implementations there can be more than one API off of the same software stack.

In at least some embodiments, traffic can be monitored to determine trends for denied requests, such that subsequent requests can be blocked based at least in part upon those trends. The request management service can emit metrics on resource consumption, such as bandwidth, processor time, number of I/O operations, number of database operations, additional requests for the resources resulting from the requests allowed for a user, the total number of requests processed, the number of valid requests, the number of invalid requests, the top requestor, source IP reputation, and other such information. Where requests are tracked per user, in some embodiments at least some of the charge for the network bandwidth might be moved from the customer to the user, at least when the user meets or exceeds a certain amount of usage. Different types of users might also have their requests routed differently, such that some users might have their requests routed to a dedicated resource, while other users might have to share a certain set of resources. In some embodiments, this denial of service mitigation service may be offered as an optional feature at extra cost or some subset of the mitigations may be offered for additional cost.

Figure 4:
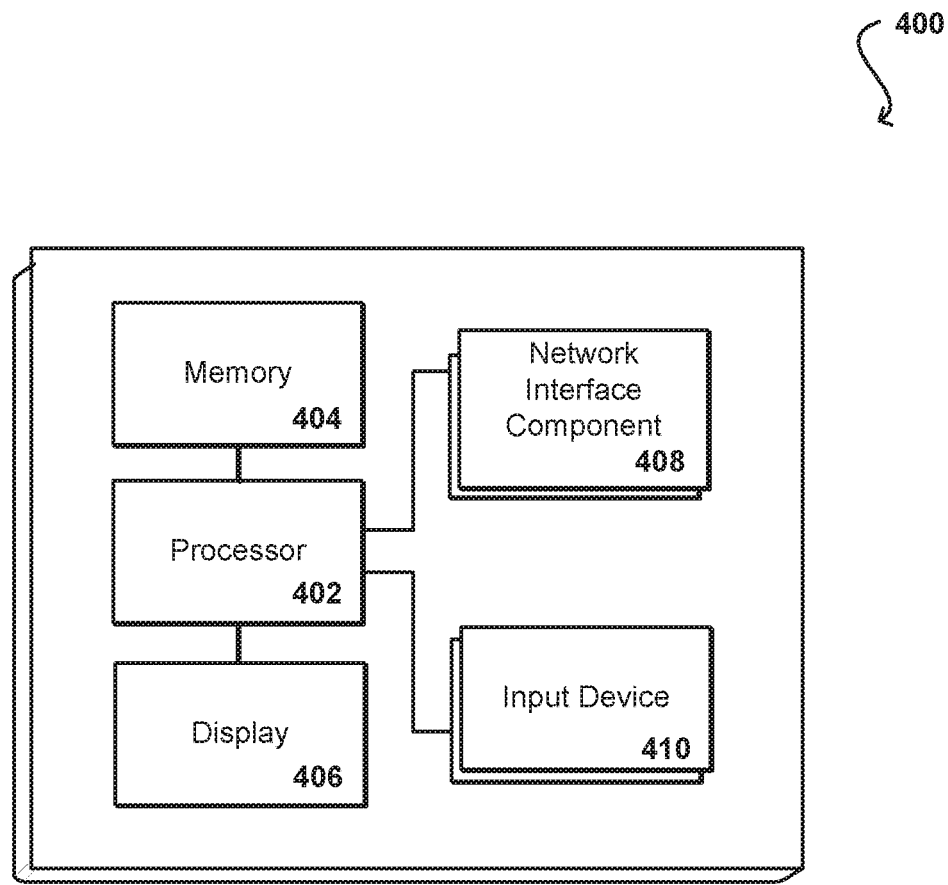
FIG. 4 illustrates example components of a computing device that can be utilized in accordance with various embodiments.

FIG. 4 illustrates a logical arrangement of a set of general components of an example computing device 400. In this example, the device includes a processor 402 for executing instructions that can be stored in a memory device or element 404. As would be apparent to one of ordinary skill in the art, the device can include many types of memory, data storage, or non-transitory computer-readable storage media, such as a first data storage for program instructions for execution by the processor 402, a separate storage for images or data, a removable memory for sharing information with other devices, etc. The device typically will include some type of display element 406, such as a touch screen or liquid crystal display (LCD), although devices such as portable media players might convey information via other means, such as through audio speakers. As discussed, the device in many embodiments will include at least one input element 410 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 400 of FIG. 4 can include one or more network interface elements 408 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system to manage requests for a service, comprising:
at least one processor; and
memory storing instructions that, when executed by the at least one processor, cause the system to:
provide access to an endpoint interface for a service by a virtual load balancer of a multi-tenant environment;
receive a communication to a virtual endpoint for the service from a computing device of a user, the communication including a signature generated using at least one security credential;
determine whether the signature is a valid signature and whether the communication is allowed according to one or more policies associated with the communication; and
forward the communication to the endpoint interface for the service when the signature is a valid signature and the communication is determined to be allowed.

2. The system of claim 1, wherein the multi-tenant environment comprises a plurality of resources that are shared among a plurality of customers, wherein the user is associated with a first customer of the plurality of customers, and wherein the instructions, when executed by the at least one processor, further cause the system to:
allocate a resource associated with a second customer of the plurality of customers for use by the service.

3. The system of claim 1, wherein the instructions, when executed by the at least one processor, further cause the system to:
annotate the communication with authentication and authorization information resulting from determining whether the signature is a valid signature and whether the communication is allowed.

4. The system of claim 1, wherein the instructions, when executed by the at least one processor, further cause the system to:
transmit at least a portion of the communication to a separate authentication and authorization service;
receive information about the communication from the separate authentication and authorization service; and
determine whether the signature is a valid signature based at least in part on the information about the communication from the separate authentication and authorization service.

5. The system of claim 1, wherein the instructions, when executed by the at least one processor, further cause the system to:
receive information about the communication from a local cache; and
determine whether the signature is a valid signature based at least in part on the information about the communication from the local cache.

6. The system of claim 1, wherein the communication is generated using at least one software development kit associated with at least one public protocol.

7. The system of claim 1, wherein the instructions, when executed by the at least one processor, further cause the system to:
retrieve the one or more policies associated with the communication based on at least one of a resource associated with the communication, a customer associated with the resource, or a service associated with the communication.

8. A computer-implemented method, comprising:
receiving, by a virtual load balancer of a multi-tenant environment, a communication to a virtual endpoint from a computing device of a user, the communication including a signature generated using at least one security credential;
determining, by the virtual load balancer of the multi-tenant environment, whether the signature is a valid signature and whether the communication is allowed according to one or more policies associated with the communication; and
forwarding, by the virtual load balancer of the multi-tenant environment, the communication to an endpoint interface for a service when the signature is a valid signature and the communication is determined to be allowed.

9. The computer-implemented method of claim 8, wherein the multi-tenant environment comprises a plurality of resources that are shared among a plurality of customers, wherein the user is associated with a first customer of the plurality of customers, and wherein the computer-implemented method further comprises:
allocating a resource associated with a second customer of the plurality of customers for use by the service.

10. The computer-implemented method of claim 8, further comprising:
annotating the communication with authentication and authorization information resulting from determining whether the signature is a valid signature and whether the communication is allowed.

11. The computer-implemented method of claim 8, further comprising:
transmitting at least a portion of the communication to a separate authentication and authorization service;
receiving information about the communication from the separate authentication and authorization service; and
determining whether the signature is a valid signature based at least in part on the information about the communication from the separate authentication and authorization service.

12. The computer-implemented method of claim 8, wherein the communication is generated using at least one software development kit associated with at least one public protocol.

13. The computer-implemented method of claim 8, further comprising:
retrieving the one or more policies associated with the communication based on at least one of a resource associated with the communication, a customer associated with the resource, or a service associated with the communication.

14. A non-transitory computer-readable storage medium including instructions that, when executed by at least one processor of a computer system, cause the computer system to:
provide access to an endpoint interface for a service by a virtual load balancer of a multi-tenant environment;
receive a communication to a virtual endpoint for the service from a computing device of a user, the communication including a signature generated using at least one security credential;

determine whether the signature is a valid signature and whether the communication is allowed according to one or more policies associated with the communication; and forward the communication to the endpoint interface for the service when the signature is a valid signature and the communication is determined to be allowed.

15. The non-transitory computer-readable storage medium of claim 14, wherein the multi-tenant environment comprises a plurality of resources that are shared among a plurality of customers, wherein the user is associated with a first customer of the plurality of customers, and wherein the instructions, when executed, further cause the computer system to:

allocate a resource associated with a second customer of the plurality of customers for use by the service.

16. The non-transitory computer-readable storage medium of claim 14, wherein the instructions, when executed, further cause the computer system to:

annotate the communication with authentication and authorization information resulting from determining whether the signature is a valid signature and whether the communication is allowed.

17. The non-transitory computer-readable storage medium of claim 14, wherein the instructions, when executed, further cause the computer system to:

transmit at least a portion of the communication to a separate authentication and authorization service;

receive information about the communication from the separate authentication and authorization service; and determine whether the signature is a valid signature based at least in part on the information about the communication from the separate authentication and authorization service.

18. The non-transitory computer-readable storage medium of claim 14, wherein the instructions, when executed, further cause the computer system to:

receive information about the communication from a local cache; and determine whether the signature is a valid signature based at least in part on the information about the communication from the local cache.

19. The non-transitory computer-readable storage medium of claim 14, wherein the communication is generated using at least one software development kit associated with at least one public protocol.

20. The non-transitory computer-readable storage medium of claim 14, wherein the instructions when executed further cause the computer system to:

retrieve the one or more policies associated with the communication based on at least one of a resource associated with the communication, a customer associated with the resource, or a service associated with the communication.

* * * * *